(12) United States Patent
Bengea et al.

(10) Patent No.: US 10,423,473 B2
(45) Date of Patent: Sep. 24, 2019

(54) FAULT-ACCOMMODATING, CONSTRAINED MODEL-BASED CONTROL USING ON-BOARD METHODS FOR DETECTION OF AND ADAPTION TO ACTUATION SUBSYSTEM FAULTS

(71) Applicant: UNITED TECHNOLOGIES CORPORATION, Farmington, CT (US)

(72) Inventors: Sorin C. Bengea, Glastonbury, CT (US); Tyler J. Selstad, West Hartford, CT (US); Timothy J. Crowley, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 38 days.

(21) Appl. No.: 15/490,575

(22) Filed: Apr. 18, 2017

(65) Prior Publication Data
US 2018/0300191 A1 Oct. 18, 2018

(51) Int. Cl.
*G06F 11/07* (2006.01)
*F02D 41/22* (2006.01)
(Continued)

(52) U.S. Cl.
CPC ............... *G06F 11/07* (2013.01); *F02D 9/00* (2013.01); *F02D 41/22* (2013.01);
(Continued)

(58) Field of Classification Search
None
See application file for complete search history.

(56) References Cited

U.S. PATENT DOCUMENTS 6,823,675 B2  11/2004  Brunell et al.
7,904,282 B2  3/2011  Goebel et al.
(Continued)

FOREIGN PATENT DOCUMENTS

EP  1420153 A2  5/2004

OTHER PUBLICATIONS

Allgower F. et al.; "Nonlinear Predictive Control and Moving Horizon Estimation—An Introductory", Advances in Control; European Control Conference: ECC '99: Aug. 31-Sep. 3, 1999, Karlsruhe, Germany, Springer London, London; Jan. 1, 1999, pp. 391-449, XP009507582; DOI: 10.1007/978-1-4471-0853-5_19; ISBN: 978-4471-0853-5; Retrieved from Internet: URL: http://link.springer.com/10.1007/978-1-4471-0853-5_19; 60 pgs.
(Continued)

*Primary Examiner* — Lail A Kleinman
(74) *Attorney, Agent, or Firm* — Cantor Colburn LLP

(57) ABSTRACT

A method for controlling a gas turbine engine having a constrained model based control (CMBC) system. The method including obtaining information about a current and previous states of the engine, updating model data information in the CMBC and a parameter estimation system based on the obtained information, and identifying trends in the data based on the information. The method also includes diagnosing the engine, based on the identified trends, determining at least one of a new constraint, objective, initial condition, model characteristic, prediction horizon, and control horizon for the control system based on the diagnosing step if the diagnosing step identified a fault condition, and adapting the CMBC system based on the at least one new constraint, objective, initial condition, model characteristic, prediction and control horizon. The method further includes generating at least on control command based on the adapting and commanding an actuator based on the control command.

19 Claims, 6 Drawing Sheets

(51) Int. Cl.
    *F15B 19/00*          (2006.01)
    *F02D 9/00*           (2006.01)
    *F02D 41/24*          (2006.01)
    *F02D 41/14*          (2006.01)
    *G05B 13/04*          (2006.01)

(52) U.S. Cl.
    CPC ........ *F02D 41/2441* (2013.01); *F15B 19/005* (2013.01); *G06F 11/0703* (2013.01); *F02D 2041/1412* (2013.01); *F02D 2041/1423* (2013.01); *F02D 2041/1433* (2013.01); *F05D 2220/321* (2013.01); *G05B 13/048* (2013.01); *Y02T 10/40* (2013.01)

(56) References Cited

U.S. PATENT DOCUMENTS

| | | |
|---|---|---|
| 8,065,022 B2 | 11/2011 | Minto et al. |
| 9,342,060 B2 | 5/2016 | Fuller et al. |
| 2004/0102890 A1 | 5/2004 | Brunell |
| 2005/0193739 A1 | 9/2005 | Brunell et al. |
| 2010/0256853 A1* | 10/2010 | Rajamani ............ G05B 23/0235 702/34 |
| 2016/0365736 A1 | 12/2016 | Block et al. |
| 2016/0371585 A1* | 12/2016 | McElhinney ....... G06F 17/5009 |
| 2017/0175645 A1* | 6/2017 | Devarakonda ............ F01N 3/20 |

OTHER PUBLICATIONS

European Search Report for Application No. 18167762.6-1007; dated Aug. 31, 2018; 12 pgs.

\* cited by examiner

FAULT-ACCOMMODATING, CONSTRAINED MODEL-BASED CONTROL USING ON-BOARD METHODS FOR DETECTION OF AND ADAPTION TO ACTUATION SUBSYSTEM FAULTS

TECHNICAL FIELD

The present disclosure relates generally to systems and methods for controlling a gas turbine engine. More specifically, the present disclosure relates to adaptive model-based control systems and methods that maximize capability after deterioration, fault, failure, or damage to one or more engine actuation subsystems so that engine performance and/or operability can be optimized within the evolving constraints imposed by these events.

BACKGROUND

Actuation subsystems in gas turbine engines include mechanical and electrical parts and/or system is that are susceptible to degradation, failure or damage which causes them or the engine to move away from nominal operating conditions.

Currently, gas turbine systems rely on sensor-based control systems, in which operating objectives and constraints are specified in terms of available sensed parameters and nominal operation of actuation subsystems. However, such sensor-based control systems do not classify degradation of these subsystems.

BRIEF DESCRIPTION

According to one embodiment of the invention, described herein is a fault-tolerant method for controlling a gas turbine engine having a constrained model based control (CMBC) system. The method including obtaining information about a current state and previous states of the gas turbine engine, updating model data information in the CMBC and a parameter estimation system based upon the obtained information, and identifying trends in the model data based on the previous and the current information. The method also includes diagnosing the gas turbine engine, based on the identified trends, determining at least one of a new constraint, a new objective, a new initial condition, a new model characteristic, a new prediction horizon, a new control horizon for the adaptive model-based control system based on the diagnosing step if the diagnosing step identified a fault condition, and adapting the CMBC system based on the at least one new constraint, new objective, new initial condition, new model characteristic, new prediction and control horizons. The method further includes generating at least one control command based on the adapting step and commanding an actuator based on the at least one control command.

In addition to one or more of the features described above, or as an alternative, further embodiments may include obtaining information about the current state and previous state of the engine comprises obtaining information about at least one of: the engine, an engine component, an engine system, an engine system component, an engine control system, an engine control system component, a gas path in the engine, gas path dynamics, an actuator, an actuation system an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

In addition to one or more of the features described above, or as an alternative, further embodiments may include that the model in the CMBC system comprises at least one of: a physics-based model, a linear system identification model, a nonlinear system identification model, a neural network model, a single simplified parameter model, a multivariable simplified parameter model, a single input single output model, and a multiple input multiple output model.

In addition to one or more of the features described above, or as an alternative, further embodiments may include that the updating step comprises updating at least one of: a state, a variable, a parameter, a quality parameter, a scalar, an adder, a constraint, an objective function.

In addition to one or more of the features described above, or as an alternative, further embodiments may include that the updating step comprises adapting the model using at least one of: a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base.

In addition to one or more of the features described above, or as an alternative, further embodiments may include that the diagnosing step comprises using at least one of a heuristic, knowledge-based, model-based detection algorithm, multi-model hypothesis testing, and multi-step, constrained optimization-based estimation.

In addition to one or more of the features described above, or as an alternative, further embodiments may include that the multi-step, optimization-based estimation includes Prediction-Error Method (PEM) and Moving Horizon Estimation (MHE) that use the information from the current state as well as from previous state.

In addition to one or more of the features described above, or as an alternative, further embodiments may include that the determining step comprises identifying at least one of a reduced specification for an actuator or sensor, wherein the reduced specification is lower than nominal specifications for the actuator or sensor.

In addition to one or more of the features described above, or as an alternative, further embodiments may include that the determining step comprises identifying at least one of a reduced stroke and stroke rate for an actuator.

In addition to one or more of the features described above, or as an alternative, further embodiments may include that the adapting step comprises modifying the model, constraints, and predetermined control parameters using information obtained about the current state of the engine.

In addition to one or more of the features described above, or as an alternative, further embodiments may include that the generating step comprises utilizing an optimizing method to determine the corrective control command given the current state of the engine, the objective function, and the new constraints.

In addition to one or more of the features described above, or as an alternative, further embodiments may include that the objective function comprises at least one of: optimize performance of the engine, optimize operability of the engine, maximize thrust, minimize thrust, maximize power, minimize power, maximize electricity use, minimize electricity use, maximize specific fuel consumption, minimize specific fuel consumption, maximize part life, minimize part life, maximize stress, minimize stress, maximize temperatures, minimize temperatures, maximize pressures, minimize pressures, maximize ratios of pressures, minimize ratios of pressures, maximize speed, minimize speed, maximize actuator commands, minimize actuator commands, maximize flows, minimize flows, maximize dollars, minimize dollars, maximize costs of operating the engine, minimize costs of operating the engine, maximize engine run time, minimize engine run time, maximize transient performance, minimize transient performance, maximize steady state performance, minimize steady state performance, maximize engine survivability, minimize engine survivability, manage stall margin, obtain desired references, obey any constraints, and prevent in-flight mishaps.

In addition to one or more of the features described above, or as an alternative, further embodiments may include that the objective function is optimized in the presence of at least one of: deterioration, fault, failure and damage.

In addition to one or more of the features described above, or as an alternative, further embodiments may include that the diagnosing step comprises computing a tracking error associated with an actuator or actuation subsystem; and further, estimating errors associated the actuator or actuation subsystem as a function of the actuator position using current and previous actuator information.

In addition to one or more of the features described above, or as an alternative, further embodiments may include that the determining step comprises computing parameters associated with the actuator or actuator subsystem as an optimization of an estimation problem formulated as a Moving Horizon Estimation (MHE) problem with an objective to minimize an error between a model-based actuator position and measurement data over a previous time interval subject to constraints associated with the parameters, and that the adapting step includes updating an actuator model with estimated parameters and estimating actuator or actuator subsystem position and velocity constraints.

In addition to one or more of the features described above, or as an alternative, further embodiments may include that the adapting step comprises re-calculating objectives and constraints for the system based on the updated actuator or actuation subsystem constraints such that a CMBC solution is achieved, otherwise removing or replacing the actuator or actuation subsystem constraints if the actuator ranges and rates prohibit achieving the objectives for the system.

In addition to one or more of the features described above, or as an alternative, further embodiments may include that the recalculating includes a change in a weighting of the objective consistent with the impact of the degraded actuator or actuation subsystems capabilities.

Also described herein in yet another embodiment is an adaptable model-based control system for controlling a gas turbine engine to optimize either performance or operability of the engine. The system including a plurality of sensors operably connected to measure a state or parameter of the engine, a plurality of actuators operably connected to the engine to control a plurality of engine parameters, and a controller operably connected to the plurality of sensors and the actuators, the controller configured to execute a diagnostic method for an adaptive constrained model-based control method for controlling the gas turbine engine.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
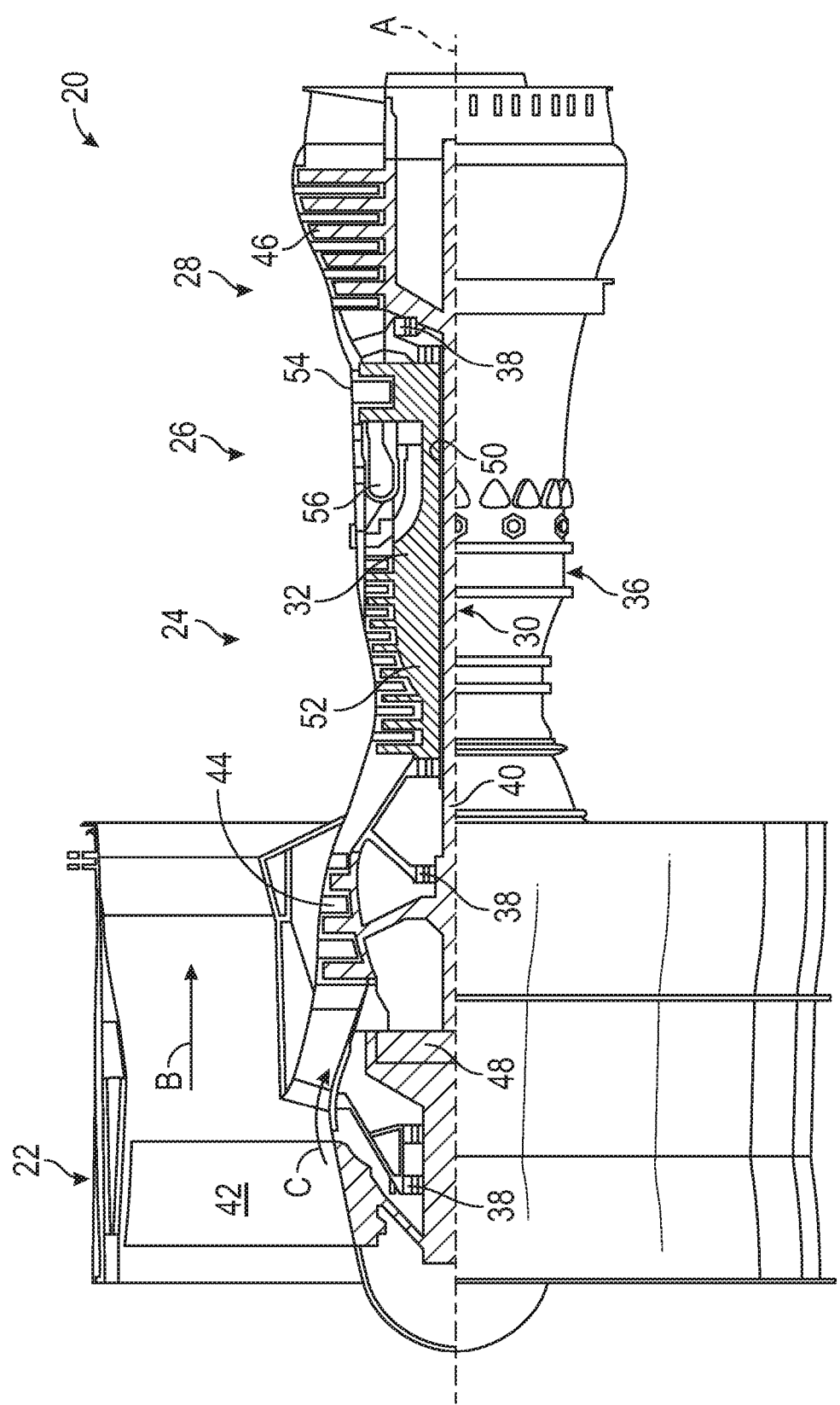
FIG. 1 depicts a simplified partial cutaway of a gas turbine engine as employed in the embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za."

Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

It is desirable to provide an estimation method that classifies engine component degradation and a method that reformulates the constrained model-based control problem with updated actuator degradation information whose solution maximizes the engine performance within the evolving actuation subsystem constraints. In particular, for a constrained, model-based control method the updated constraint values and objectives must be updated consistently to ensure that the model-based control input synthesis is made within a feasible search space (bounded by system-level and actuation subsystem constraints).

In general, embodiments herein relate generally to a system level approach to estimate parameters that characterize actuation subsystem faults (in particular, faults related to position, rate, and statuses) by trending their position, rate measurements in response to commanded values and then adaptation of the control system algorithms to the detected faults and degradation. In other words, the described embodiments use the specific information related to actuator subsystem faults, determined in part through long term trend data in order to adapt the Constrain Based Model Control employed for engine control to update data and models to the new associated constraints and maintain close-to-optimal operation within these new constraints. Advantageously the described embodiments employ an automated system level Built In Test (BIT) methodology eliminating the need for ground test equipment. Furthermore, the described embodiments consider all system level components that may contribute to the actuator response position and time, whereas conventional ground test methods may typically, only measure the single failures of a signal component.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
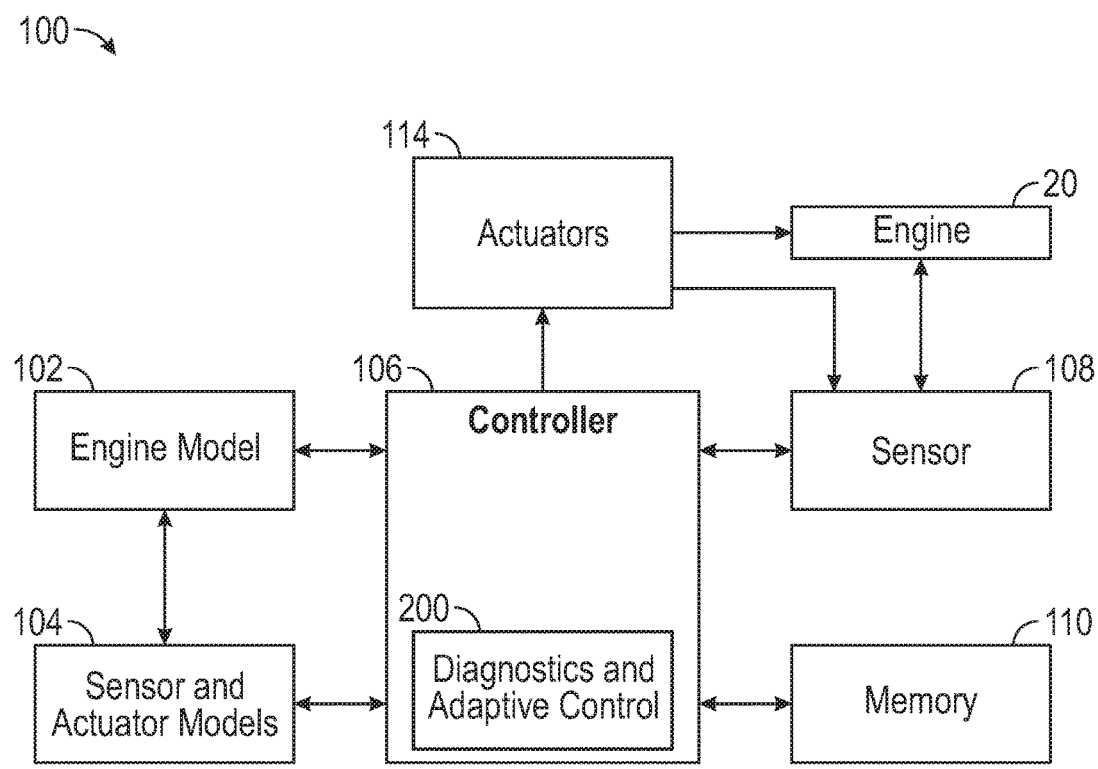
FIG. 2 is a simplified block diagram of an engine control system in accordance with an embodiment.

FIG. 2 illustrates an exemplary embodiment of an engine model based engine control system 100 as may be employed with engine 20. As shown in FIG. 2, system 100 includes engine 20, an actuator 114 and a sensor 108 that is communicatively coupled with a processor or controller 106. Sensor 108 is any of a variety of sensor employed in the engine including temperature, pressure, flow, speed and position sensors, and the like. In this embodiment, and for the purposes of description of the embodiments herein the sensor 108 is an position sensor associated with one or more of the actuators abut other types of sensors (e.g., flow meters and speed sensors) also could be used.

The processor 106 is communicatively coupled to the actuator 114 to provide commands to control the engine 20. In addition the processor 106 is operatively coupled to a memory 110, sensor and actuator models 104, and an engine model 102. The sensor and actuator models 104 are associated with any of the sensor(a) 108 and actuators 114, and, in this embodiment, are communicatively coupled with the engine model 102. Alternatively, functionality associated with a sensor and actuator models 104 may be an integrated with an engine model 102 in other embodiments. Further, in other embodiments engine model 102 and/or sensor and actuator model 104 may be integrated into various components such as, for example, into a Full Authority Digital Engine Control (FADEC) system such as system 100. In an exemplary embodiment, the FADEC may be physically attached to the gas turbine engine 20.

In operation, the sensor 108 monitors an engine or operating parameter, such as temperature, pressure, position, and the like, and provides data corresponding to the parameter to the processor 106, which may store the data in memory 110. The processor 106 processes the data stored in the memory 110 and employs the data in various control algorithms and diagnostics. In some embodiments, the processor 106 compares from the sensor 108 to corresponding data of the sensor and actuator model 104. If the difference between the measured data of the sensor 108 and the reference data of the actuator model 104 is outside of a threshold value, the processor 106 may take various steps to address the difference including update the sensor and actuator model 104 with the data of the sensor 108, ignoring the difference between measured data and model data or other mitigation steps as discussed further herein. In an embodiment, by updating the reference data of the actuator model 104, degradation of the actuator 114, which may occur over time, can be accommodated.

Monitoring engine parameter data provides the basis for performing gas turbine engine performance tracking. The dynamic behavior of measurement devices, particularly detecting and quantifying the changes in the dynamic responses of measurement devices, is useful in performing gas turbine engine performance tracking. By monitoring sensors data based on transient behavior, steady state behavior and trend data, degradation of engine actuators 114 may be detected that may not be perceived when the engine is operating at steady state alone. Ascertaining and distinguishing degraded performance trends may allow the engine model 102 and sensor and actuator model 104 to be updated in order to compensate for sensor degradation.

The described embodiments include adaptive model-based control systems 100 and diagnostic and adaptive control methods 200. These systems 100 and methods 200 may detect deterioration and degradation, faults, failures or damage to an engine, and incorporate such information into the various models, optimizations, objective functions, constraints and/or parameters in the control system 100 to allow the control system 100 to quickly take optimized action to regain as much performance and/or operability as possible given the current engine condition. Current data regarding the dynamic characteristics of the sensors 108 and actuators 114 providing this information is useful in maintaining appropriate control. Particularly, it is desirable for sensor and actuator models 104 and engine models 102 to detect and accommodate faulty actuators 114. This accommodation is accomplished by updating the models 102, 104 in the model-based control system with any detected changes. These changes may include engine-to-engine variation, deterioration, mechanical, electrical or chemical faults, failures, or damage to the engine or any of the engine components, and mechanical, electrical or chemical faults, failures or damage to the control system and/or its components. The engine models 102 and sensor and actuator model 104 in the control system 100 may be adapted by using a filter, tracking filter, logic or other suitable method to modify states, variables, quality parameters, scalars, adders, constraints, limits or any other adaptable parameter of the model(s) 102, 104 so that the performance and limitations of the model match that of the engine 20 after the parameter is changed.

Using the information about any detected changes, together with the updated models 102, 104, the model-based control system 100 is able to evaluate the current condition of the engine 20 and take a more optimized control action than would have been possible if the model(s) 102, 104 had not been updated and if such information had not been passed to the control system 100. One advantage of the control systems 100 of the described embodiments and methods is that, since they can be updated in real-time, they allow for any level of deterioration, fault, failure or damage to be accommodated, not just deterioration, faults, failures and damage that have a priori solutions already programmed into the model(s) 102, 104 in the control system 100.

Engine models 102 and sensor and actuator models 104 also provide the reference level for performing gas turbine engine performance tracking and anomaly detection to monitor engine and engine sensor and actuator deterioration. Such tracking supports maintenance operations and logistics as well as alerting operators of potential failure of engines 20. This information reduces exposure to inoperation shutdowns and unscheduled engine maintenance or removals. It should be appreciated that not every eventuality is likely to be covered in the models 102, 104 employed, it is desirable for such models 102, 104 to reconfigure, adapt, and learn to make predictions or corrections based on various engine parameters, and conditions. In some embodiments, such adaptability for normal or deteriorated conditions comes from using an estimator or tracking filter to modify model inputs, outputs, or interior parameters as conditions change. Such adaptability for faults, failures, degradations, or damage conditions comes from using diagnostics, that can select between different models 102, 104, modify model inputs, outputs, or interior parameters, or can modify the optimizations, objective functions, constraints, and/or parameters in the control system 100. Therefore, the embodiments described below allow for the trend data regarding the response of engine sensors and actuators 108, 114 to be determined. These trend data provide for the detection of actuator anomalies that may not typically be detectable, yet aid in the prediction of failures. This enables the adjustment and/or correction of engine models 102 and sensor and actuator models 104 to compensate for degradation in one or more sensors and actuators.

In embodiments described, any physical system, control system 100 or property of the engine 20 or engine subsystem may be modeled, including, but not limited to, the engine itself, the gas path and gas path dynamics: sensors 108, actuators 114, effectors, or other controlling devices that modify or change any engine behavior. The models 102, 104 of these components and/or systems may be physics-based models (including their linear approximations). Additionally or alternatively, the models may be based on linear and/or nonlinear system identification, neural networks, and/or combinations of all of these.

Gas turbine engines such as engine 20 due to the large range of operating conditions and power levels experienced during operation require complex modeling techniques. Logically, turbine operation is restricted due to mechanical, aerodynamic, thermal and flow limitations. Model predictive controls (MPC) are ideal for such environments because they can specifically handle the nonlinearities, and both the input and output constraints of many variables, all in a single control formulation. Model predictive controls are full state feedback controls that use a model of the process/system/ component to predict the output, up to a certain instant of time, based on the inputs to the system and the most recent process measurements. Model Inverting controls are full state feedback controls that use an inverted model of the process/system/component (engine, actuator, sensor, and the like) to formulate and generate reference commands based on actual measured conditions. Model Inverting control input values are calculated by inverting the dynamical equations that relate the actuator inputs to the desired outputs pertaining to various control objectives, given knowledge of the full state of the system. In addition, these calculations account for various constraints associated with the effectors and for performance and operation related limits associated with key engine parameters.

In the described embodiments, prognostic and diagnostic technologies, such as heuristic, knowledge-based, model-based detection algorithms and/or multi-model hypothesis testing, are also used. Fault accommodation is also used, such as by sensor, actuator and gas path fault detection and isolation, by reconfiguring the model-based control to accommodate failures in a variety of manners.

In the embodiments described, as an example, a multi-variable Constrained Model-Based Control (CMBC) architecture is employed in control system 100 for controlling the engine 20, the control scheme may be based on Model Predictive Control (MPC) or Model Inverting Control (MIC) techniques. Model-based control techniques take advantage of the model to gain access to unmeasured engine parameters, in addition to the normal sensed parameters. These unmeasured parameters may comprise, for example, thrust, stall margins, component efficiencies, and/or airflows. These controls can be multiple-input multiple-output (MIMO) to account for interactions of the control loops, they can be model-based, and they can have limits or constraints built as an integral part of the control formulation and optimization to avoid designing controllers for each limit.

Figure 3:
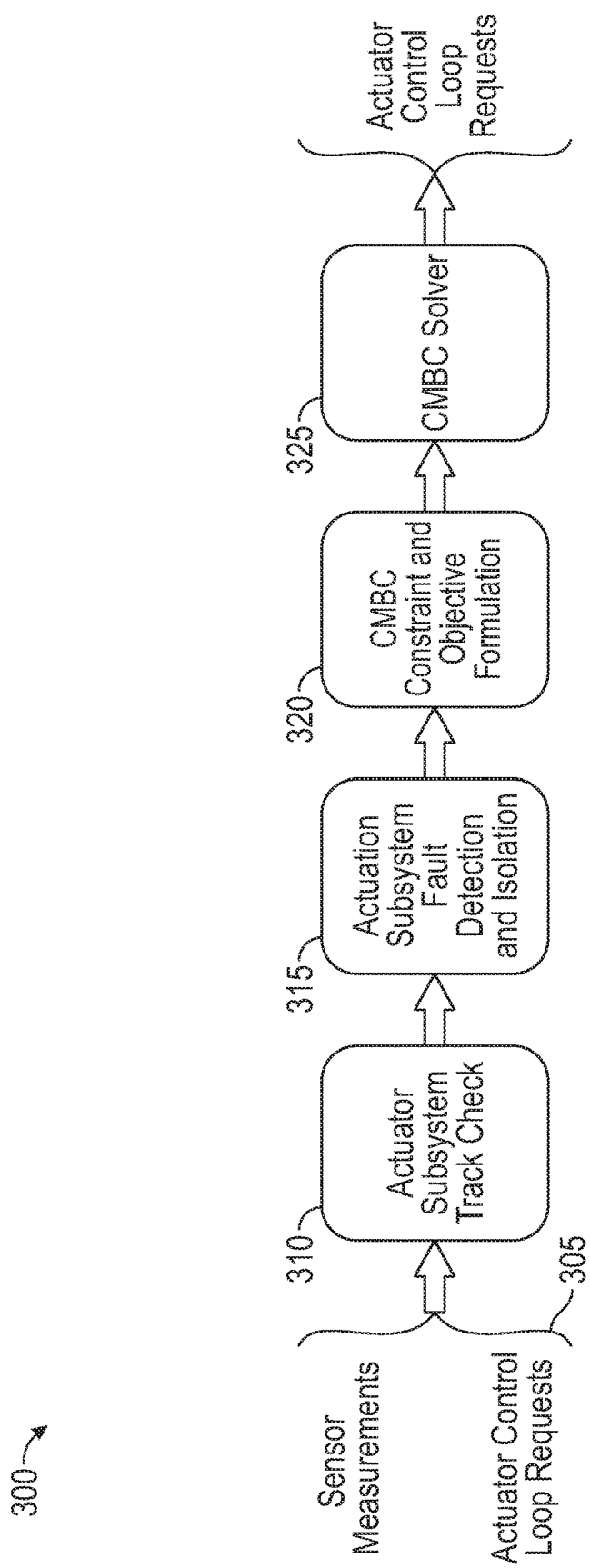
FIG. 3 is a simplified block diagram of the diagnostic process in the engine control system in accordance with an embodiment.

Continuing with FIG. 2 and turning to FIG. 3 as well, because each engine is different, deteriorates, degrades, experience faults, or be damaged, the model should be able to track or adapt itself to follow such changes. The engine model should preferably reveal current information about how a particular engine 20 is running at a given time. This allows the future behavior of the engine 20 to be more accurately predicted, and allows smaller faults or damage levels of the engine 20 to be detected. Engine parameters and states are two areas of the engine model 102 that can be modified to match the engine model 102 to the current engine 20. A parameter estimator may be used to determine the engine parameters, and a state estimator may be used to determine the states. A parameter estimator estimates and modifies parameters in the engine model 102 so as to reduce the error between the engine sensors 108 and the model sensors 104. This is called tracking the model to the engine. A state estimator may be used to further aid in tracking the model to the engine. The state information may also be used to initialize the model-based control at each time interval. Likewise, components of the engine 20 may degrade, experience faults, the models 102, 104 and the control system 100 should be able to track or adapt itself to follow such changes. Actuator parameters and states can be observed and employed in the actuator model 104 to match the model 104 to the current actuators. A parameter estimator may be used to determine the engine parameters, and a state estimator may be used to determine the states.

Using model based control(s) allows the control system to use all the information provided by the system model, estimator, and diagnostic processes. The algorithm used herein allows the controller to see what the engine is going to do over time and at the same time know the engine operating constraints. The control system can then modify all of the control actions to ensure that none of the constraints are violated while satisfying a given control objective. In other words the control ideally can develop an improved, if not the best possible, solution to meet the mission requirements within the constraints presented.

MPC, in this instance, is based on the constrained open-loop optimization of a finite objective function. This optimization commences from an assumed known initial state and uses a dynamic system model to describe the evolution of the outputs. The objective function is a mathematical way of defining the goal of the control system. The objective function determines what is defined as optimal. Some general objective functions are to: minimize fuel consumption, maximize thrust, maximize engine life, minimize stress, minimize temperatures, follow reference pressures, follow reference ratios of pressures, follow reference thrust or power, follow reference speed, minimize or maximize actuator command(s), follow reference flow(s), minimize dollars, and/or minimize costs. The optimization algorithm used inside the control can be constrained or unconstrained, linear or non-linear.

Reconfigurable model predictive control (MPC) has all the characteristics of traditional MPC, but also has additional abilities. Reconfigurable MPC can modify or reconfigure the models, constraints, and/or objective functions based on estimator information, diagnostic information and commands from a master mode selector. In embodiments, the first step for the reconfigurable model predictive control is to collect the data from the other system components (i.e., which model (normal or faulted) to use, the current state of the model, the covariance of the state estimates, the objective function, the constraints, and the reconfiguration information). Reconfiguration of the model may take the form of modifying input, output, or interior parameters, or it may mean switching between different models. Reconfiguration of the constraints may take the form of changing actuator position or rate limits, changing state constraints, or changing output constraints. Reconfiguration of the objective function may take the form of changing the references to follow, changing the weights of the objective function terms, or changing the goals. With any or all of the control elements reconfigured, then the optimization may be performed to determine the best possible control action to take.

The role of the diagnostics in the described embodiments is to detect, isolate, and identify any deterioration or degradation, fault, failure, or damage in the gas turbine engine system 20. In some embodiments, the diagnostic and adaptive control method 200 may be based on model-based diagnostics, or multi-model based diagnostics, where information from the other control components like the engine model 102 sensor and actuator model 104, and model structure, innovations, parameter updates, states, sensor values, sensor estimates, etc. are used to diagnose the engine and components. With such information, the diagnostics can determine if there is an fault, where the fault is located, and the magnitude of the fault, and then the controller can adjust the operation of the control system 100 accordingly. FIG. 3 depicts one of the diagnostic processes for observing trend data for a component, sensor 108 or actuator 114 and then employing the trend data in the control system 100. While in an embodiment description is made with reference to an actuator, other components and systems may be applicable.

In an embodiment, the diagnostic process performs a method for detection and diagnosis of a subsystem fault (related to position, rate, and statuses) of an actuator 114 by trending their position measurement in response to commanded values. The control system 100 then adapts to the detected fault or degradation to improve performance of the control system 100 and the operation of the engine 20. In an embodiment the diagnostics and adaptive control method 200 includes, but is not limited to logic for identifying the fault in the actuator 114 by comparing position and rates of motion with those corresponding to healthy-actuator values. These algorithms that can be executed periodically, similar to a Built-In-Test (BIT) or more often depending on the testing and data, particularly during selected operational regimes. For example, during operation of the engine 20, tests conducted to evaluate the stroke and rate of an actuator may be conducted. In addition, during selected operational regimes of the engine 20 data may be collected on the current operation of actuator to supplement and build trend data. The type of faults and degradation of the actuator 114 to be identified may be based on the actuator responses to predetermined actuator commands, modeled expected behavior, constraints or limits of operation and the like. Such algorithms can identify specific parameters associated with the actuator subsystem models (e.g. bandwidth, delay, etc.), trend them using historical data, and map them to specific failures.

Turning now to FIG. 3 as well, for details of the diagnostic and adaptive control method 300, initially as shown at 305 the sensor measurements from sensor 108 and 114 and control loop requests are received by the controller 106. At step 310 an actuator subsystem track check is initiated. In an embodiment, the track check includes monitoring and comparing position and rates of motion of an actuator 114 with those corresponding to healthy-actuator values as depicted at step 315. The comparison values can be part of a database, stored parameters in a look up table, or even a built based on the models 104 (FIG. 2). Faults can be characterized as failures, i.e., inoperative actuator, or degradations that is, actuators 114 with stroke or actuation rates that are not fully compliant with requirements, but may still be sufficiently functional to be utilized or partially utilized. For example, an actuator 114 that is exhibiting reduced stroke, but otherwise operating satisfactorily may be more advantageous to employ in the control system 100 for overall operation of the engine 20 as opposed to treating the actuator as faulted and not employing the actuator at all. Likewise, an actuator 114 that exhibits reduced travel rates (e.g., runs slow) may still possess sufficient capability to provide some benefit in the control system 100.

Continuing with FIG. 3, at process block 320 the control system 100, method 300 uses the specific information related to actuator 114 faults, determined in part in order to adapt the CMBC data and models to the new associated constraints. In existing configurations of model based control, commonly the degree of freedom associated with an actuator 114 that is identified as faulted is removed from operation and not used. This approach eliminates one degree of freedom for the control system 100 with respect to the actuator 114 and may limit performance of the control system 100 and engine 20. It should be appreciated that in systems that may include redundancy to ensure fault tolerant capability, sacrificing a degree of freedom may still be acceptable to maintain operation, degraded operation, and the like. Advantageously, the described enhancements to the control system 100 operate instead to periodically update actuator health and constraint information in the CMBC of the control system 100. That is, the controller operates under selected conditions to update its actuator constraints (related to position, rate, and bandwidth) (where they would have been considered failed in the past). Moreover, the control system can now use the updated constraints, (e.g., range, rate of operation) and coordinate it with the other actuators 114.

As depicted at process step 325, the CMBC algorithms in the control system 100 may then adapt to a new configuration of employing the actuator 114 that is exhibiting new constraints. Adaptation in this case means using new constraint information, while maintaining to a large extent the same control architecture. Depending on the context of the faults, the objective or object function of the CMBC can be changed as well to accommodate the actuator faults. Using reconfigurable model based control(s) allows the control system 100 to use more or all of the information provided by the system model, estimators, and diagnostic algorithms. Model predictive control (MPC) uses the model and the current state information in the control to predict the future behavior of the engine or system. Because a prediction of the future behavior can be formed given an evolution of control inputs, many different control inputs can be tested to see which ones will track the desired references (e.g., speeds, pressure ratios, thrust, etc.), while still obeying any operating constraints (e.g., limits on the actuators, temperatures, speeds, pressures, torques, etc.). The algorithm used herein allows the controller to see what the engine is going to do over the future time horizon, and at the same time know the engine operating constraints. The control can then modify all of the control actions to ensure that none of the constraints are violated while optimally satisfying the control objective. This means that the control can develop the best possible solution to meet the mission requirements.

Figure 4:
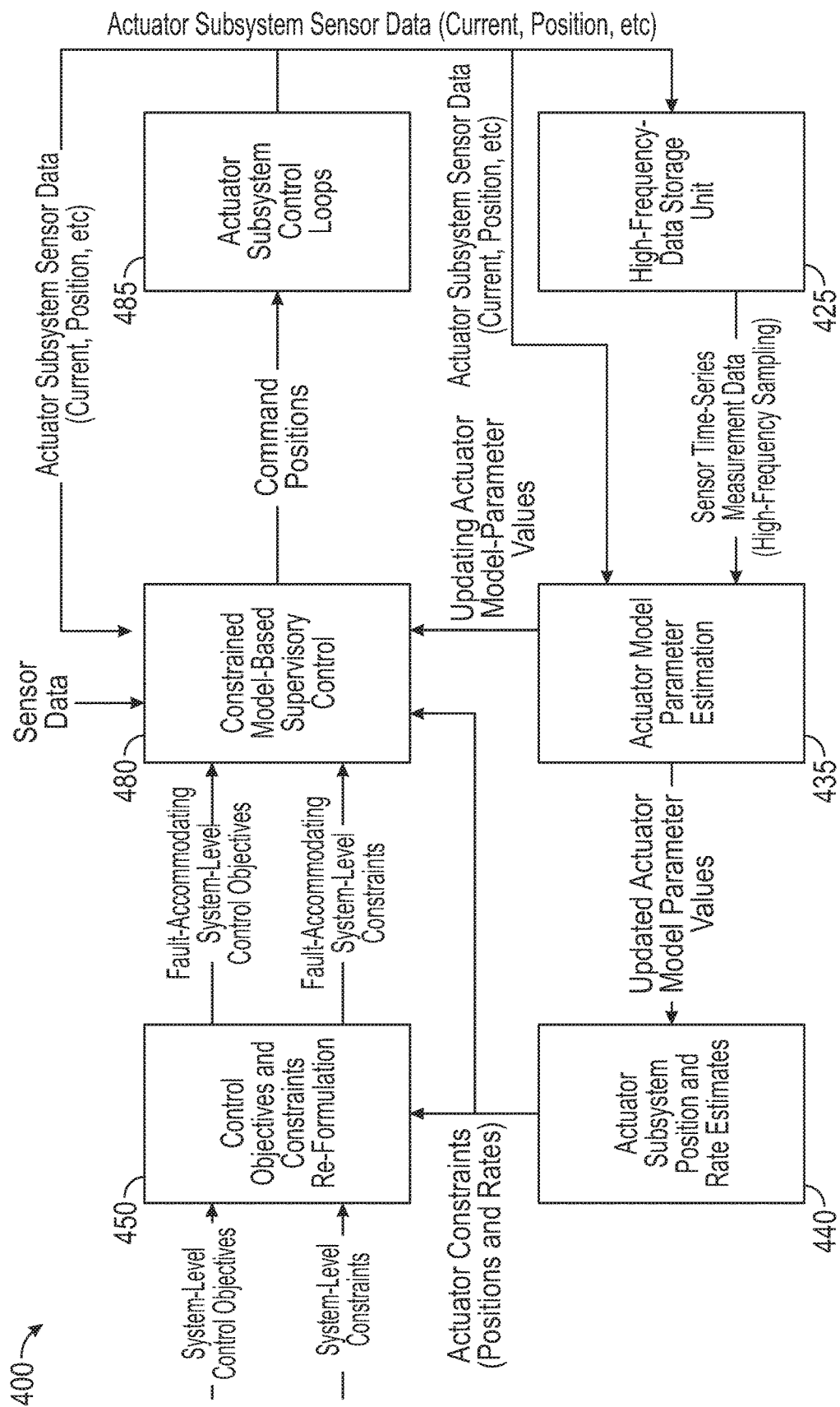
FIG. 4 depicts a more detailed depiction of the diagnosis and adaptive control method in accordance with an embodiment.

FIG. 4 depicts a more detailed interconnection of the diagnosis and adaptive control method 400 in accordance with an embodiment. Turning now to FIG. 4 as well, for details of the diagnostic and adaptive control method 400, initially as shown at 405 the sensor measurements and control loop requests are received. An actuator subsystem track check is initiated at block 435. The track check includes monitoring and comparing position and rates of motion of an actuator with those corresponding to healthy-actuator values. The comparison values can be part of a database 425, stored parameters in a look up table, or even built based on the models 104 (FIG. 2). Faults can be characterized as failures, i.e., inoperative actuator, or degradations that is, actuators 114 with stroke or actuation rates that are not fully compliant with requirements, but may still be sufficiently functional to be utilized or partially utilized. At block 435 new actuator parameter models are established based on both the measured and stored data and the track check. From these new parameters at block 440 a new set of actuator and actuation system constraints are established. At process block 450 the control objectives and system operational constraints are reformulated in light of the newly established constraints from bock 440. These new constraints are employed in the CMBC control algorithms 480 to for the engine to formulate new constraint based commands to the actuators and actuator control loop as depicted at block 485.

The algorithm used herein allows the controller to determine what the engine is going to do over the future time horizon, and at the same time know the engine operating constraints. The control can then modify all of the control actions to ensure that none of the constraints are violated while optimally satisfying the control objective. This means that the control can develop the best possible solution to meet the mission requirements.

Figure 5A:
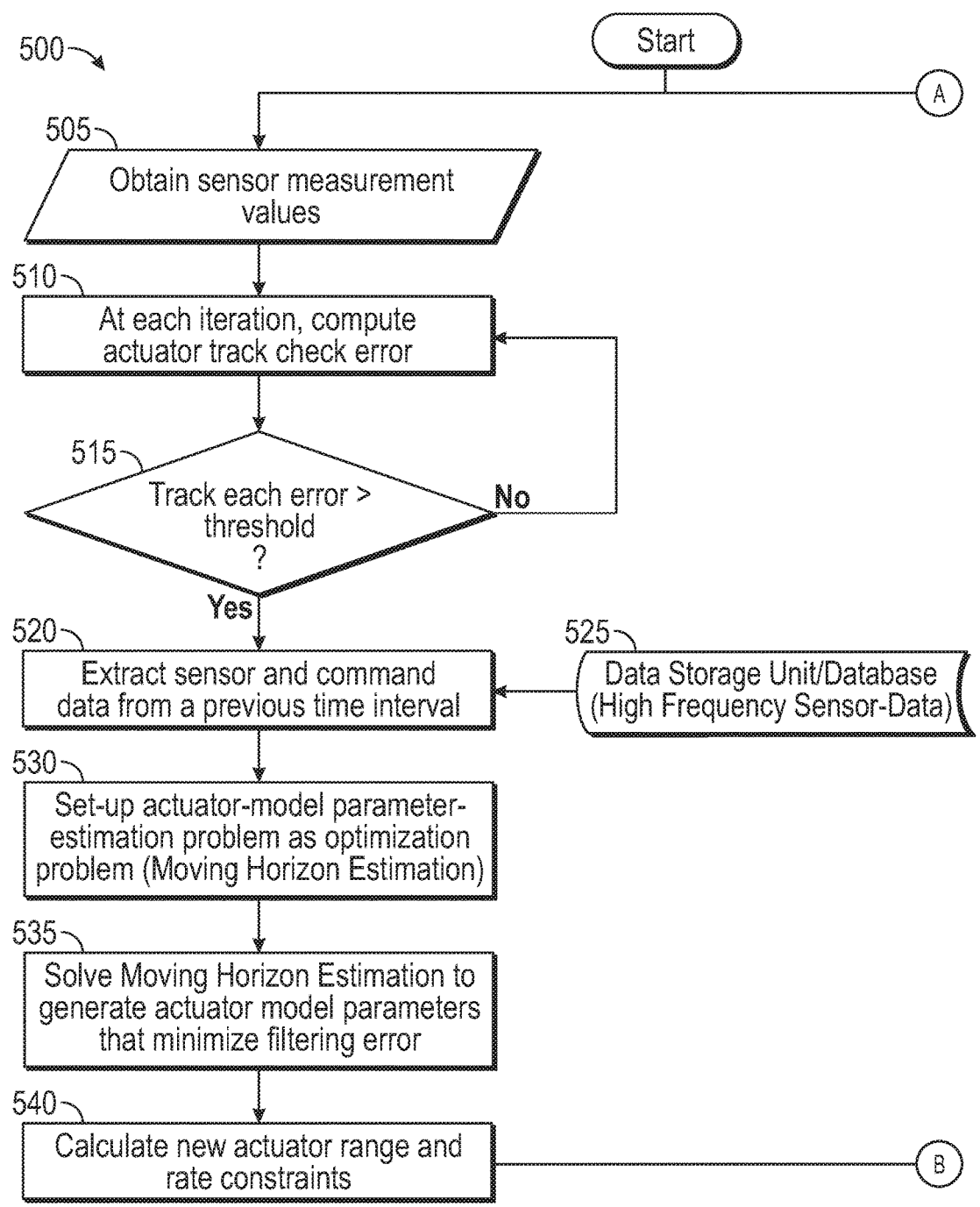
FIG. 5A depicts an example the diagnosis and adaptive control method for an actuator in accordance with an embodiment.
Figure 5B:
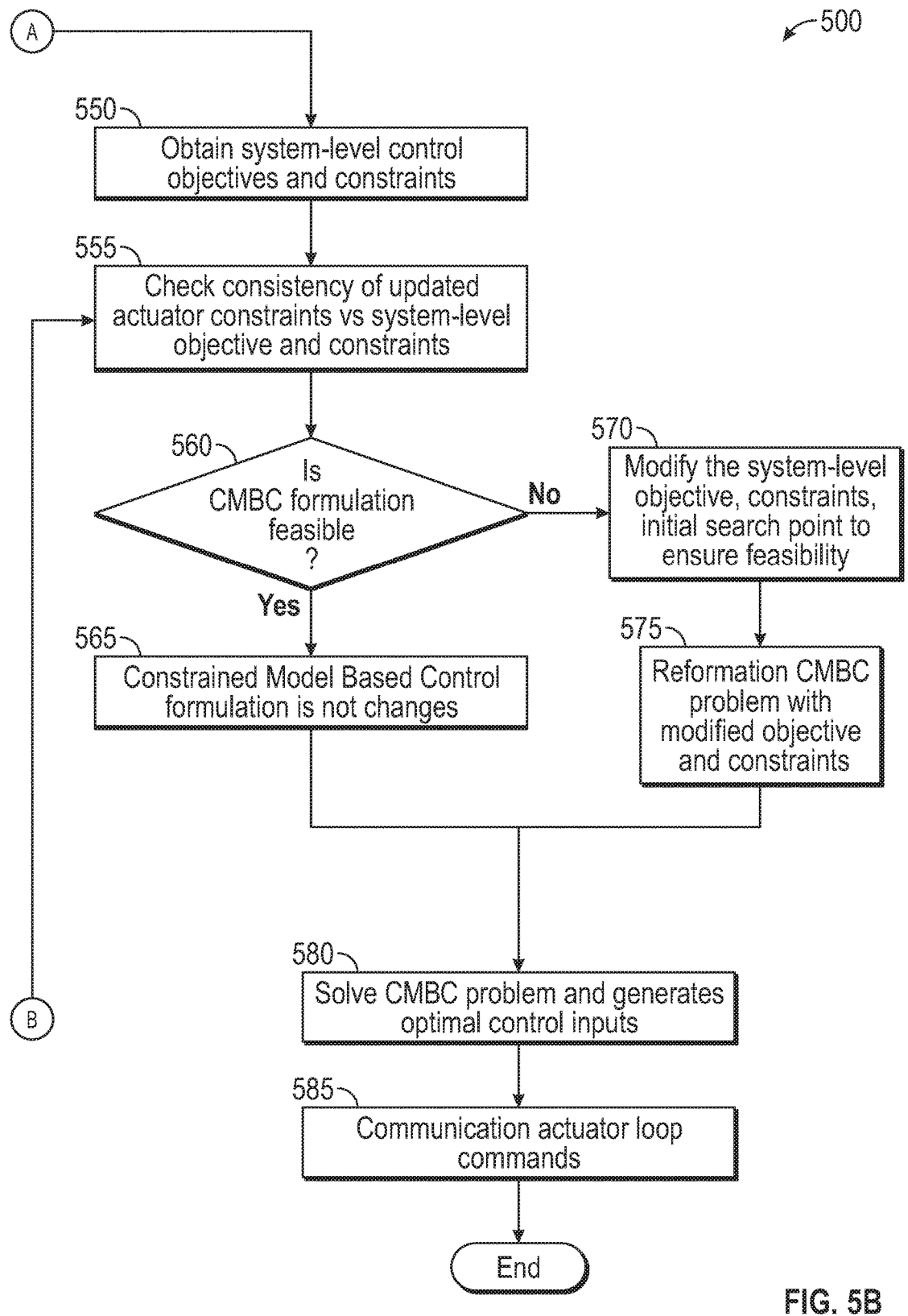
FIG. 5B depicts a continuation of the example the diagnosis and adaptive control method for an actuator of FIG. 5A in accordance with an embodiment.

Turning now to FIGS. 5A and 5B, for a more detailed view of an embodiment employing a diagnostic and adaptive control method 500 is depicted. The method is initiated at process steps, 505 where measurements from the sensors 108 and actuators 114 are collected and system level constraints and objectives are established as depicted at process blocks 550. For the sensor data at step 510 an actuator subsystem track check is initiated to see if the actuator data exceeds selected thresholds such as those depicted at block 515. In an embodiment, the track check includes monitoring and comparing position and rates of motion of an actuator 114 with those corresponding to healthy-actuator values as depicted at step 510. The comparison values can be part of a database, stored parameters in a look up table, or even a built based on the models 104 (FIG. 2). Faults can be characterized as failures, i.e., inoperative actuator, or degradations for example actuators 114 with stroke or actuation rates that are not fully compliant with requirements, but may still be sufficiently functional to continue to be utilized. For example, an actuator 114 that is exhibiting reduced stroke, but otherwise operating satisfactorily may be more advantageous to employ in the control system 100 for overall operation of the engine 20 as opposed to treating the actuator 114 as faulted and not employing the actuator at all. Likewise, an actuator 114 that exhibits reduced travel rates (e.g., runs slow) may still possess sufficient capability to provide some benefit in the control system 100.

Continuing with FIG. 4, at process block 520 after computing an overall tracking error (actual position relative to commanded positions) associated with each actuator or actuation subsystem 114 (for example, associated with controlling flow areas related to compressors and turbines, and with the fuel system and the like). The data is then used it to trigger a fault-tolerant control reformulation starting with estimating individual errors associated each actuator or actuation subsystem 114 as a function of the actuator position using current and previous actuator high-frequency information from a database (commanded position, current, actual position, etc.).

At process block 530, the method 500 continues with computing the actuator or actuator subsystem parameters (e.g., parameters associated with damping, friction, leakage for fuel-draulic actuators, and the like). In an embodiment the computation is implemented as an optimization solution of an multi-step estimation problem formulated as a Moving Horizon Estimation (MHE) or Prediction-Error Method (PEM) that use the information from the current state as well as from previous states. MHE is an optimization problem with the objective to minimize the error between the model-based actuator position and the high-frequency measurement data (historical data) over a previous time interval. The solution as shown at process block 535 is calculated subject to constraints associated with these parameters. In an embodiment, the high-frequency data is extracted from a Data Storage Unit 525 or from a dedicated memory block/unit. Finally at process block 535 the method continues with estimating the extreme (max and min) actuator position and velocity magnitudes constraints based on the actuator model updated with estimated parameters from steps 530 and 535.

Continuing with the other half of the flow chart of the control system 100, and method 500 of FIGS. 5A and 5B, the new constraints are provided to the CBMC portion of the diagram where the controller uses the specific information related to actuator 114 faults and constraints, determined as described above in order to adapt the CMBC data and models to the new associated constraints. In existing configurations of model based control, commonly the degree of freedom associated with an actuator 114 that is identified as faulted is removed from operation and not used. This approach eliminates one degree of freedom for the control system 100 with respect to the actuator 114 and may limit performance of the control system 100 and engine 20. It should be appreciated that in systems that may include redundancy to ensure fault tolerant capability, sacrificing a degree of freedom may still be acceptable to maintain operation, degraded operation, and the like. Advantageously, the described enhancements to the control system 100 of the method 500 operate instead to periodically update actuator health and constraint information in the CMBC of the control system 100. That is, the controller operates under selected conditions to update its actuator constraints (related to position, rate, bandwidth) (where they would have been considered failed in the past). Moreover, the control system can now use the updated constraints, (e.g., range, rate of operation) and coordinate it with the other actuators 114. For further detail on adapting the CMBC system based on the new the new data and constraints, at process block 555 the new rate and range constraints are compared with the overall system and operational constraints from process block 550. The new constraints are then verified to ensure that a CBMC formulation for control of the engine is feasible within the new constraints.

Re-calculating the system-level objectives and constraints based on the updated actuator and actuation subsystem 114 constraints ensures feasibility of the constrained model-based control problem. In an embodiment, in the simplest case, for example, in scenarios corresponding to mild degradation of actuators (small increases in friction for example) this step can consist in simply updating the actuator constraints as depicted at process block 565. Conversely, when the degradations are more severe and the actuator ranges and rates prohibit achieving the system-level objectives, (for example the actuator or actuator subsystem is working very poorly, or not at all, these unachievable objectives are removed and replaced with corresponding constraints. For example, when a vane position objective cannot be achieved due to degradation of its actuator, the objective is removed and the vane constraints are made consistent with the actuator constraints over the optimization horizon associated with the CMBC as depicted at process blocks 570 and 575. In other embodiments this can involve a selection of the initial condition of the optimum-input search algorithm that is feasible, within the updated and evolving constraints; these updates (objectives, constraints, model characteristics, initial point, solver tolerances, prediction and control horizons, solver steps) ensure that the search algorithm is feasible and its solution can be computed within a pre-allocated number of steps.

As depicted at process step 580, the CMBC algorithms in the control system 100 may then adapt to a new configuration of employing the actuator 514 that is exhibiting new constraints. Adaptation in this case means using new constraint information, while maintaining to a large extent the same control architecture. Depending on the context of the faults, the objective or object function of the CMBC can be changed as well to accommodate the actuator faults. Using reconfigurable model based control(s) allows the control system 100 to use more or all of the information provided by the system model, estimators, and diagnostic algorithms. Model predictive control (MPC) uses the model and the current state information in the control to predict the future behavior of the engine or system. Because a prediction of the future behavior can be formed given an evolution of control inputs, many different control inputs can be tested to see which ones will track the desired references (e.g., speeds, pressure ratios, thrust, etc.), while still obeying any operating constraints (e.g., limits on the actuators, temperatures, speeds, pressures, torques, etc.). The algorithm used herein allows the controller to see what the engine is going to do over the future time horizon, and at the same time know the engine operating constraints. The control can then modify all of the control actions to ensure that none of the constraints are violated while optimally satisfying the control objective. This means that the control can develop the best possible solution to meet the mission requirements as depicted at process block 585.

By adapting the constraints and objectives of CMBC during engine operation (and potentially faulty actuator models), subsystems with actuators 114 can still be employed within their limited operating range in order to achieve performance and operability goals as close as possible to their nominal ranges. Therefore this adaptation improves if not maximizes the performance of the control system 100 to the extent possible within the new actuator constraints. Advantageously, these systems and methods are adaptive so that any level of deterioration, faults, failures or damage may be accommodated, not just deterioration, faults, failures or damage that have a priori solutions already programmed into the system.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the FIGS. 2-4, 5A and 5B show the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A fault-tolerant method for controlling a gas turbine engine having a constrained model based control (CMBC) system, the method comprising:
obtaining information about a current state and previous states of the gas turbine engine;
updating model data information in the CMBC system and a parameter estimation system based upon the obtained information;
identifying trends in the model data based on the previous and the current information;
diagnosing a condition of the gas turbine engine, based on the identified trends;
determining at least one of a new constraint, a new objective, a new initial condition, a new model characteristic, a new prediction horizon, and a new control horizon for the CMBC system based on the diagnosing step if the diagnosing step identified a fault condition, wherein the determining includes identifying at least one of a reduced specification for an actuator or sensor, wherein the reduced specification is lower than nominal specifications for the actuator or sensor;
adapting the CMBC system based on the at least one new constraint, new objective, new initial condition, new model characteristic, new prediction and control horizons;
generating at least one control command based on the adapting step; and
performing an engine operation based on the at least one control command.

2. The method of claim 1, wherein obtaining information about the current state and previous state of the engine comprises obtaining information about at least one of: the engine, an engine component, an engine system, an engine system component, an engine control system, an engine control system component, a gas path in the engine, gas path dynamics, an actuator, an actuation system an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

3. The method of claim 1, wherein the model in the CMBC system comprises at least one of: a physics-based model, a linear system identification model, a nonlinear system identification model, a neural network model, a single simplified parameter model, a multivariable simplified parameter model, a single input single output model, and a multiple input multiple output model.

4. The method of claim 1, wherein the updating step comprises updating at least one of: a state, a variable, a parameter, a quality parameter, a scalar, an adder, a constraint, an objective function.

5. The method of claim 1, wherein the updating step comprises adapting the model using at least one of: a linear estimator, a non-linear estimator, a linear state estimator, a non-linear state estimator, a linear parameter estimator, a non-linear parameter estimator, a linear filter, a non-linear filter, a linear tracking filter, a non-linear tracking filter, linear logic, non-linear logic, linear heuristic logic, non-linear heuristic logic, linear knowledge base, and non-linear knowledge base.

6. The method of claim 1, wherein the diagnosing step comprises using at least one of a heuristic, knowledge-based, model-based detection algorithm, multi-model hypothesis testing, and multi-step, constrained optimization-based estimation.

7. The method of claim 6, wherein the multi-step, optimization-based estimation includes Prediction-Error Method (PEM) and Moving Horizon Estimation (MHE) that use the information from the current state as well as from previous state.

8. The method of claim 1, wherein the determining step comprises identifying at least one of a reduced stroke and stroke rate for an actuator.

9. The method of claim 1, wherein the adapting step comprises modifying the model, constraints, and predetermined control parameters using information obtained about the current state of the engine.

10. The method of claim 1, wherein the generating step comprises utilizing an optimizing method to determine the control command given the current state of the engine, the new objective, and the new constraints.

11. The method of claim 10, wherein the objective function comprises at least one of: optimize performance of the engine, optimize operability of the engine, maximize thrust, minimize thrust, maximize power, minimize power, maximize electricity use, minimize electricity use, maximize specific fuel consumption, minimize specific fuel consumption, maximize part life, minimize part life, maximize stress, minimize stress, maximize temperatures, minimize temperatures, maximize pressures, minimize pressures, maximize ratios of pressures, minimize ratios of pressures, maximize speed, minimize speed, maximize actuator commands, minimize actuator commands, maximize flows, minimize flows, maximize dollars, minimize dollars, maximize costs of operating the engine, minimize costs of operating the engine, maximize engine run time, minimize engine run time, maximize transient performance, minimize transient performance, maximize steady state performance, minimize steady state performance, maximize engine survivability, minimize engine survivability, manage stall margin, obtain desired references, obey any constraints, and prevent in-flight mishaps.

12. The method of claim 11, wherein the objective function is optimized in the presence of at least one of: deterioration, fault, failure and damage.

13. The method of claim 1, wherein the diagnosing step comprises computing a tracking error associated with an actuator or actuation subsystem and
estimating errors associated the actuator or actuation subsystem as a function of the actuator position using current and previous actuator information.

14. The method of claim 13, wherein the determining step comprises computing parameters associated with the actuator or actuator subsystem as an optimization of an estimation problem formulated as a Moving Horizon Estimation (MHE) problem with an objective to minimize an error between a model-based actuator position and measurement data over a previous time interval subject to constraints associated with the parameters and wherein the adapting step includes updating an actuator model with estimated parameters and estimating actuator or actuator subsystem position and velocity constraints.

15. The method of claim 14, wherein the adapting step comprises re-calculating objectives and constraints for the system based on the updated actuator or actuation subsystem constraints such that a CNBC solution is achieved, otherwise removing or replacing the actuator or actuation subsystem constraints if the actuator ranges and rates prohibit achieving the objectives for the system.

16. The method of claim 15 wherein the recalculating includes a change in a weighting of the objective consistent with the impact of the degraded actuator or actuation subsystems capabilities.

17. A system for controlling a gas turbine engine to optimize either performance or operability of the engine, the system comprising:
  a plurality of sensors operably connected to measure a state or parameter of the engine;
  a plurality of actuators operably connected to the engine to control a plurality of engine parameters;
  a controller operably connected to the plurality of sensors and the actuators, the controller configured to execute a diagnostic method for adapting a constrained model-based control (CMBC) system for controlling the gas turbine engine, the method comprising:
  obtaining information about a current state and previous states of the gas turbine engine;
  updating model data information in the CMBC system and a parameter estimation system based upon the obtained information;
  identifying trends in the model data based on the previous and the current information;
  diagnosing a condition of the gas turbine engine, based on the identified trends;
  determining at least one of a new constraint, a new objective, a new initial condition, a new model characteristic, a new prediction horizon, and a new control horizon for the CMBC system based on the diagnosing step if the diagnosing step identified a fault condition, wherein the determining step comprises identifying at least one of a reduced specification for an actuator or sensor, wherein the reduced specification is lower than nominal specifications for the actuator or sensor;
  adapting the CMBC system based on the at least one new constraint, new objective, new initial condition, and new model characteristic;
  generating at least one control command based on the adapting step; and
  performing an engine operation based on the at least one control command.

18. The system of claim 17, wherein at least one of the current state and the previous state of the engine comprises obtaining information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

19. The system of claim 17, wherein the CMBC system comprises at least one of: a physics-based model, a linear system identification model, a nonlinear system identification model, a neural network model, a single simplified parameter model, a multivariable simplified parameter model, a single input single output model, and a multiple input multiple output model.

* * * * *